US012015901B2

(12) United States Patent
Awano et al.

(10) Patent No.: US 12,015,901 B2
(45) Date of Patent: Jun. 18, 2024

(54) INFORMATION PROCESSING DEVICE, AND CALCULATION METHOD

(71) Applicant: Mitsubishi Electric Corporation, Tokyo (JP)

(72) Inventors: Tomoharu Awano, Tokyo (JP); Masaru Kimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 222 days.

(21) Appl. No.: 17/830,931

(22) Filed: Jun. 2, 2022

(65) Prior Publication Data

US 2022/0295180 A1 Sep. 15, 2022

Related U.S. Application Data

(63) Continuation of application No. PCT/JP2019/049975, filed on Dec. 20, 2019.

(51) Int. Cl.
*H04R 3/00* (2006.01)
*H04R 1/40* (2006.01)
(Continued)

(52) U.S. Cl.
CPC ............. *H04R 3/005* (2013.01); *H04R 1/406* (2013.01); *H04R 3/04* (2013.01); *H04R 29/005* (2013.01)

(58) Field of Classification Search
CPC ...... G10L 2021/02166; G10L 21/0208; H04R 1/406; H04R 2201/403; H04R 2430/03;
(Continued)

(56) References Cited

U.S. PATENT DOCUMENTS

2010/0094625 A1* 4/2010 Mohammad ............ G10L 25/78 704/233
2013/0108078 A1* 5/2013 Ma ........................... H04R 3/04 381/103
(Continued)

FOREIGN PATENT DOCUMENTS

JP 2010-176105 A 8/2010
JP 2018-141922 A 9/2018

OTHER PUBLICATIONS

Asano, "Array Signal Processing for Acoustics—Localization, Tracking and Separation of Sound Sources", Corona Publishing Co., Ltd., 2011, Tokyo, Japan, pp. 86-87, total 5 pages.
(Continued)

*Primary Examiner* — Lun-See Lao
(74) *Attorney, Agent, or Firm* — Birch, Stewart, Kolasch & Birch, LLP

(57) ABSTRACT

An information processing device includes a sound signal acquisition unit that acquires sound signals outputted from a mic array, an analysis unit that analyzes frequencies of the sound signals, an information acquisition unit that acquires predetermined information indicating a steering vector in a first direction as a direction from the mic array to a target sound source, and a calculation unit that calculates a filter for formation in a second direction as a direction different from the first direction based on the frequencies and the information indicating the steering vector in the first direction and calculates a steering vector in the second direction by using an expression indicating a relationship between the calculated filter and the steering vector in the second direction.

12 Claims, 8 Drawing Sheets

(51) Int. Cl.
*H04R 3/04* (2006.01)
*H04R 29/00* (2006.01)

(58) Field of Classification Search
CPC ............ H04R 2430/23; H04R 2430/25; H04R 2499/13; H04R 29/005; H04R 3/005; H04R 3/04
USPC ................................................ 381/92, 56–58
See application file for complete search history.

(56) References Cited

U.S. PATENT DOCUMENTS

| | | | | |
|---|---|---|---|---|
| 2019/0385630 | A1* | 12/2019 | Sivaraman | G10L 21/02 |
| 2019/0385635 | A1* | 12/2019 | Shahen Tov | G10L 25/21 |
| 2019/0392859 | A1* | 12/2019 | Li | G10L 25/84 |
| 2020/0058310 | A1* | 2/2020 | Goodwin | G10L 19/00 |

OTHER PUBLICATIONS

International Search Report for PCT/JP2019/049975 mailed on Mar. 3, 2020.

Written Opinion of the International Searching Authority for PCT/JP2019/049975 (PCT/ISA/237) mailed on Mar. 3, 2020.

* cited by examiner

INFORMATION PROCESSING DEVICE, AND CALCULATION METHOD

CROSS-REFERENCE TO RELATED APPLICATION

This application is a continuation application of International Application No. PCT/JP2019/049975 having an international filing date of Dec. 20, 2019.

BACKGROUND OF THE INVENTION

1. Field of the Invention

The present disclosure relates to an information processing device, and a calculation method.

2. Description of the Related Art

Sound is collected into a microphone (hereinafter referred to as a mic). The sound is voice, for example. The sound as the target of the sound collection is referred to as target sound. In technologies regarding sound, the signal-noise (S/N) ratio is important. Beamforming (beam forming) technology is known as a method for increasing the S/N ratio.

In the beamforming technology, a mic array is used. In the beamforming technology, a beam is formed in a sound source direction of the target sound (namely, an arrival direction of the target sound) by using characteristic differences (e.g., phase differences) of a plurality of sound collection signals. By this method, the target sound is emphasized while suppressing unnecessary sound such as noise and masking sound. For example, the beamforming technology is used in a speech recognition process executed in a place where the noise is loud, hands-free communication performed in a vehicle, and so forth.

In the beamforming technology, fixed beamforming and adaptive beamforming are known.

For example, a delay and sum (DS) method is used in the fixed beamforming. In the DS method, differences in the time of arrival at the mic array from the sound source are used. In the DS method, a delay is added to each sound collection signal as a signal of sound collection. A beam is formed in the sound source direction of the target sound by a sum total based on the sound collection signals to which the delays have been added.

Further, in the adaptive beamforming, a minimum variance (MV) method is used, for example. The MV method is described in Non-patent Reference 1. In the MV method, a beam is famed in a direction from the mic array to the sound source of the target sound (hereinafter referred to as a target sound direction) by using a steering vector (SV) indicating the target sound direction. Further, in the MV method, a null beam is formed to suppress unnecessary sound. By this method, the S/N ratio is increased. In environments where the direction of the unnecessary sound (hereinafter referred to as a masking sound direction) changes, the adaptive beamforming is more effective than the fixed beamforming.

Performance of the MV method is dependent on correctness of the SV. The SV of the target sound direction is represented by impulse response of sound inputted to the mic array from the target sound direction. Further, the SV a(ω) indicating the target sound direction is represented by the following expression (1): The character ω represents a frequency. The number of mics in the mic array is N (N: integer greater than or equal to 1). The expression "$a_1(\omega)$, $a_2(\omega)$, . . . , $a_N(\omega)$" represents the impulse response of sound inputted to each mic from the target sound direction. T represents transposition.

$$SVa(\omega)=[a_1(\omega),a_2(\omega), \ldots ,a_N(\omega)]^T \quad (1)$$

Incidentally, the SV needs to be updated since the target sound direction changes with time. However, it is difficult for a measurer to measure the impulse response with the elapse of time. Thus, updating the SV is also difficult. In such a circumstance, a technology for updating an estimate value of the SV has been proposed (see Patent Reference 1).

Patent Reference 1: Japanese Patent Application Publication No. 2010-176105

Non-patent Reference 1: Futoshi Asano, "Array Signal Processing of Sound—Localization/Tracking and Separation of Sound Source", Corona Publishing Co., Ltd., 2011

Incidentally, the SV is calculated by measuring the impulse response. The work of measuring the impulse response carried out by the measurer increases the load on the measurer.

SUMMARY OF THE INVENTION

An object of the present disclosure is to reduce the load on the measurer.

An information processing device according to an aspect of the present disclosure is provided. The information processing device includes a sound signal acquisition unit that acquires sound signals outputted from a plurality of microphones, an analysis unit that analyzes frequencies of the sound signals, an information acquisition unit that acquires predetermined information indicating a steering vector in a first direction as a direction from the plurality of microphones to a target sound source, and a first calculation unit that calculates a filter for formation in a second direction as a direction different from the first direction based on the frequencies and the information indicating the steering vector in the first direction and calculates a steering vector in the second direction by using an expression indicating a relationship between the calculated filter and the steering vector in the second direction.

According to the present disclosure, the load on the measurer can be reduced.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein.

DETAILED DESCRIPTION OF THE INVENTION

Embodiments will be described below with reference to the drawings. The following embodiments are just examples and a variety of modifications are possible within the scope of the present disclosure.

First Embodiment

Figure 1:
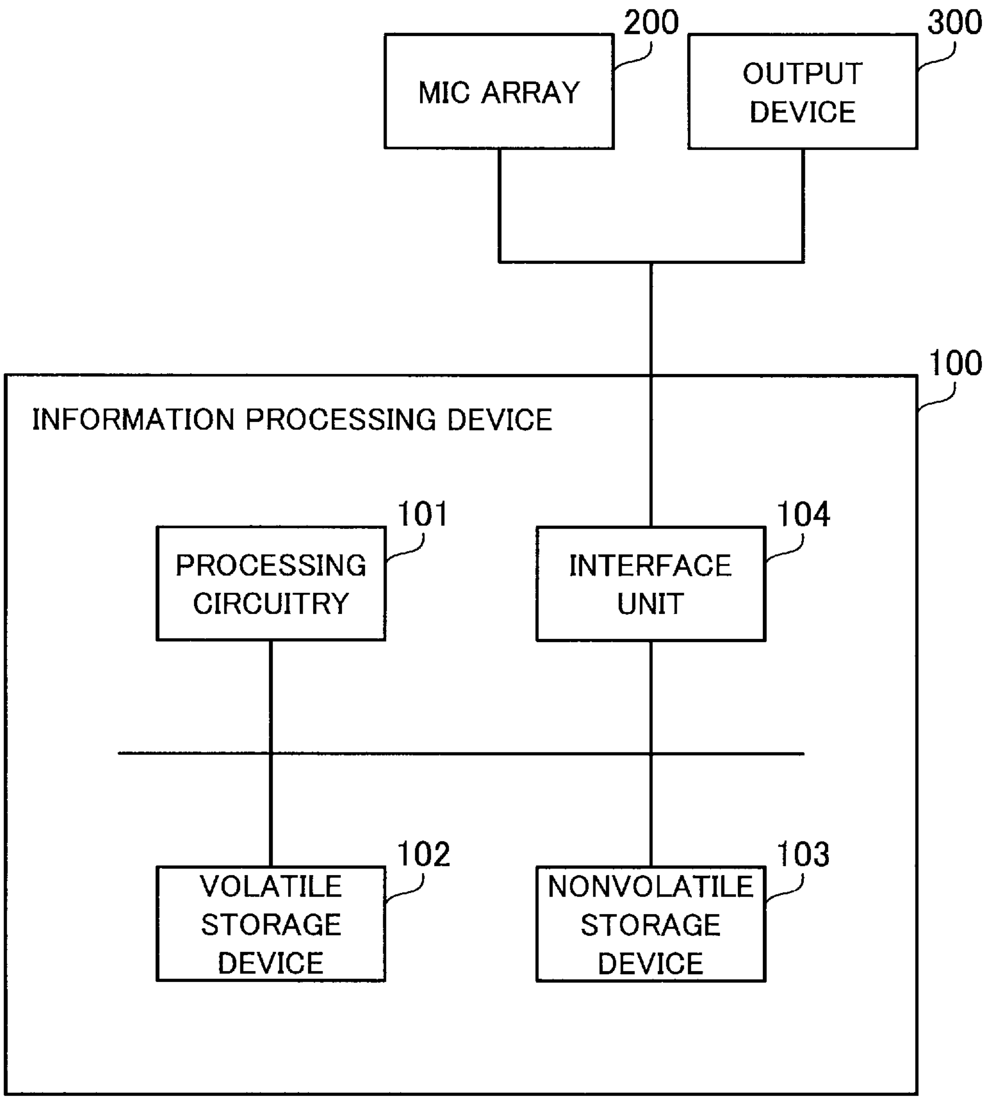
FIG. 1 is a diagram (No. 1) showing a hardware configuration included in an information processing device in a first embodiment.

FIG. 1 is a diagram (No. 1) showing a hardware configuration included in an information processing device in a first embodiment. An information processing device 100 is a device that executes a calculation method. The information processing device 100 is connected to a mic array 200 and an output device 300. The mic array 200 includes a plurality of mics. The output device 300 is a speaker, for example.

The information processing device 100 includes a processing circuitry 101, a volatile storage device 102, a nonvolatile storage device 103 and an interface unit 104. The processing circuitry 101, the volatile storage device 102, the nonvolatile storage device 103 and the interface unit 104 are connected together by a bus.

The processing circuitry 101 controls the whole of the information processing device 100. For example, the processing circuitry 101 is a Digital Signal Processor (DSP), an Application Specific Integrated Circuit (ASIC), a Field-Programmable GATE Array (FPGA), a Large Scale Integrated circuit (LSI) or the like.

The volatile storage device 102 is main storage of the information processing device 100. The volatile storage device 102 is a Random Access Memory (RAM), for example.

The nonvolatile storage device 103 is auxiliary storage of the information processing device 100. The nonvolatile storage device 103 is a Hard Disk Drive (HDD) or a Solid State Drive (SSD), for example.

The interface unit 104 connects to the mic array 200 and the output device 300.

Figure 2:
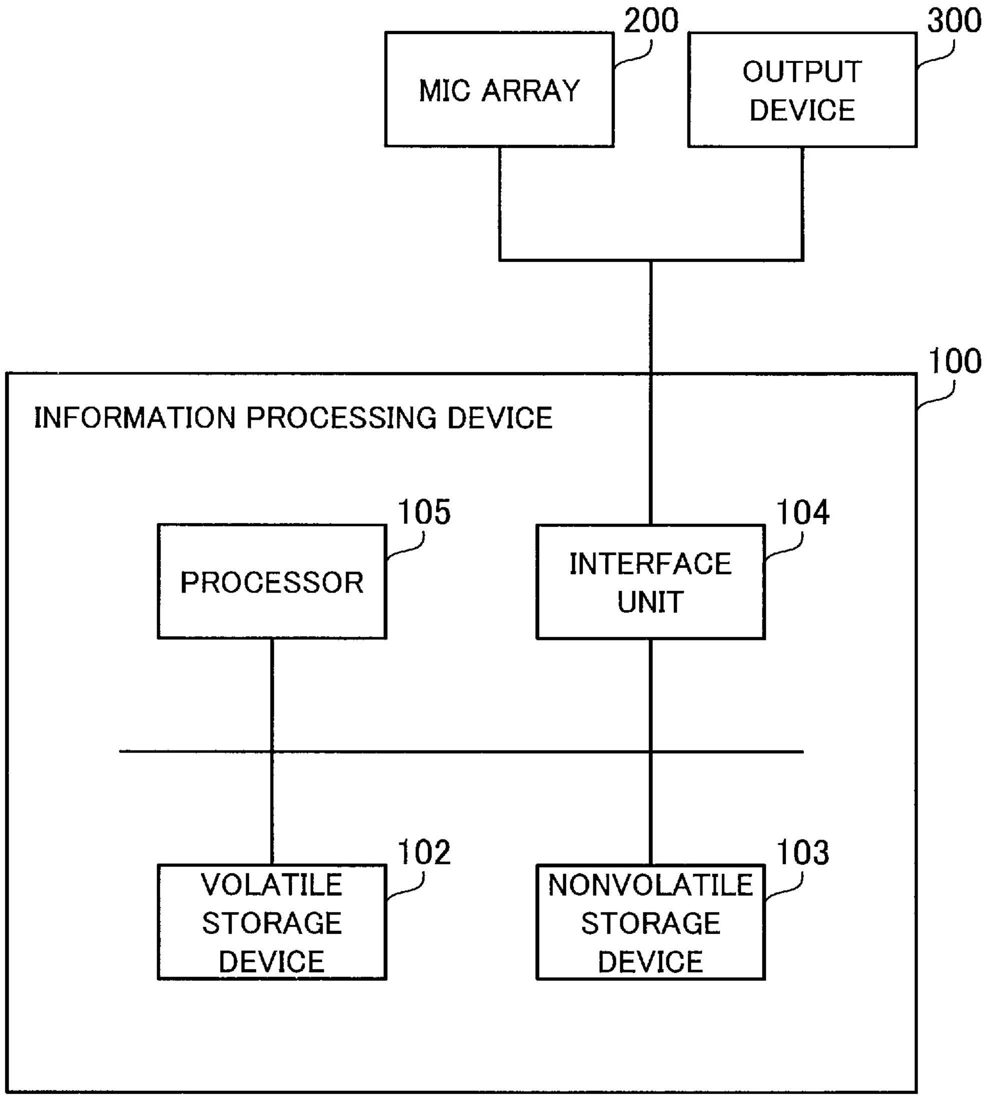
FIG. 2 is a diagram (No. 2) showing a hardware configuration included in the information processing device in the first embodiment.

The information processing device 100 may also have the following hardware configuration:

FIG. 2 is a diagram (No. 2) showing a hardware configuration included in the information processing device in the first embodiment. The information processing device 100 includes a processor 105, the volatile storage device 102, the nonvolatile storage device 103 and the interface unit 104.

The volatile storage device 102, the nonvolatile storage device 103 and the interface unit 104 have been described with reference to FIG. 1. Thus, the description is left out for the volatile storage device 102, the nonvolatile storage device 103 and the interface unit 104.

The processor 105 controls the whole of the information processing device 100. For example, the processor 105 is a Central Processing Unit (CPU).

Figure 3:
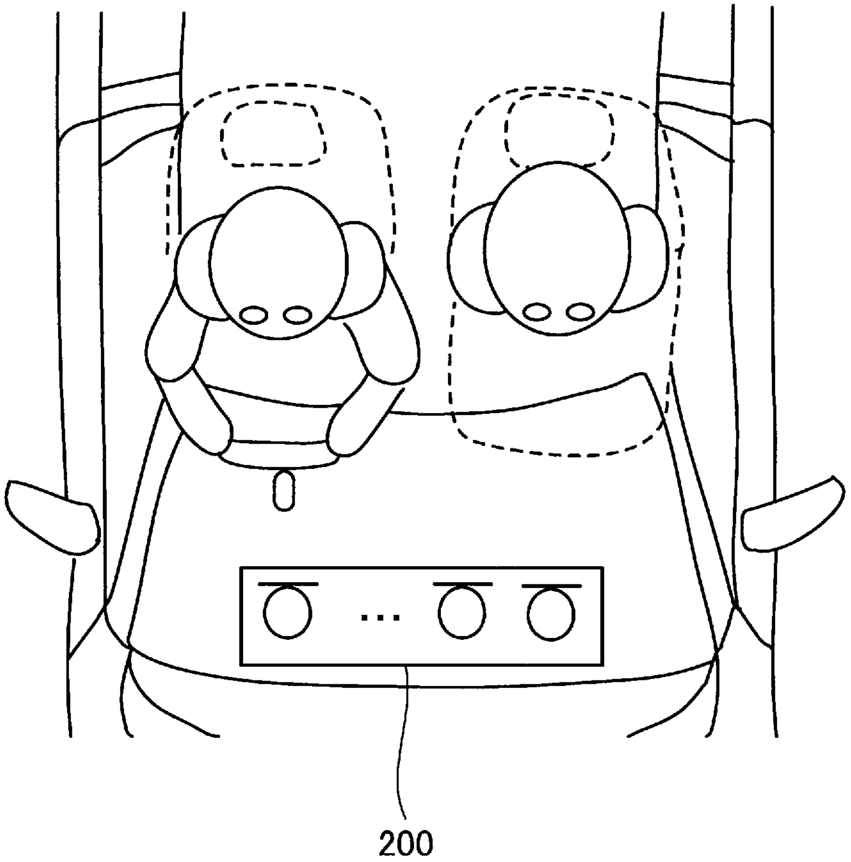
FIG. 3 is a diagram showing a concrete example of an environment to which the first embodiment is applicable.

FIG. 3 is a diagram showing a concrete example of an environment to which the first embodiment is applicable. FIG. 3 indicates that there exist persons seated on a driver seat and a passenger seat. Further, FIG. 3 indicates the mic array 200.

For example, a driver seat direction is assumed to be the target sound direction. A passenger seat direction is assumed to be the masking sound direction. The information processing device 100 is capable of setting voice of the person seated on the driver seat as the target of the sound collection. The information processing device 100 is capable of setting voice of the person seated on the passenger seat to be excluded from the target of the sound collection.

The following description will be given by using a case where one or more persons exist in a vehicle.

Next, functions of the information processing device 100 will be described below.

Figure 4:
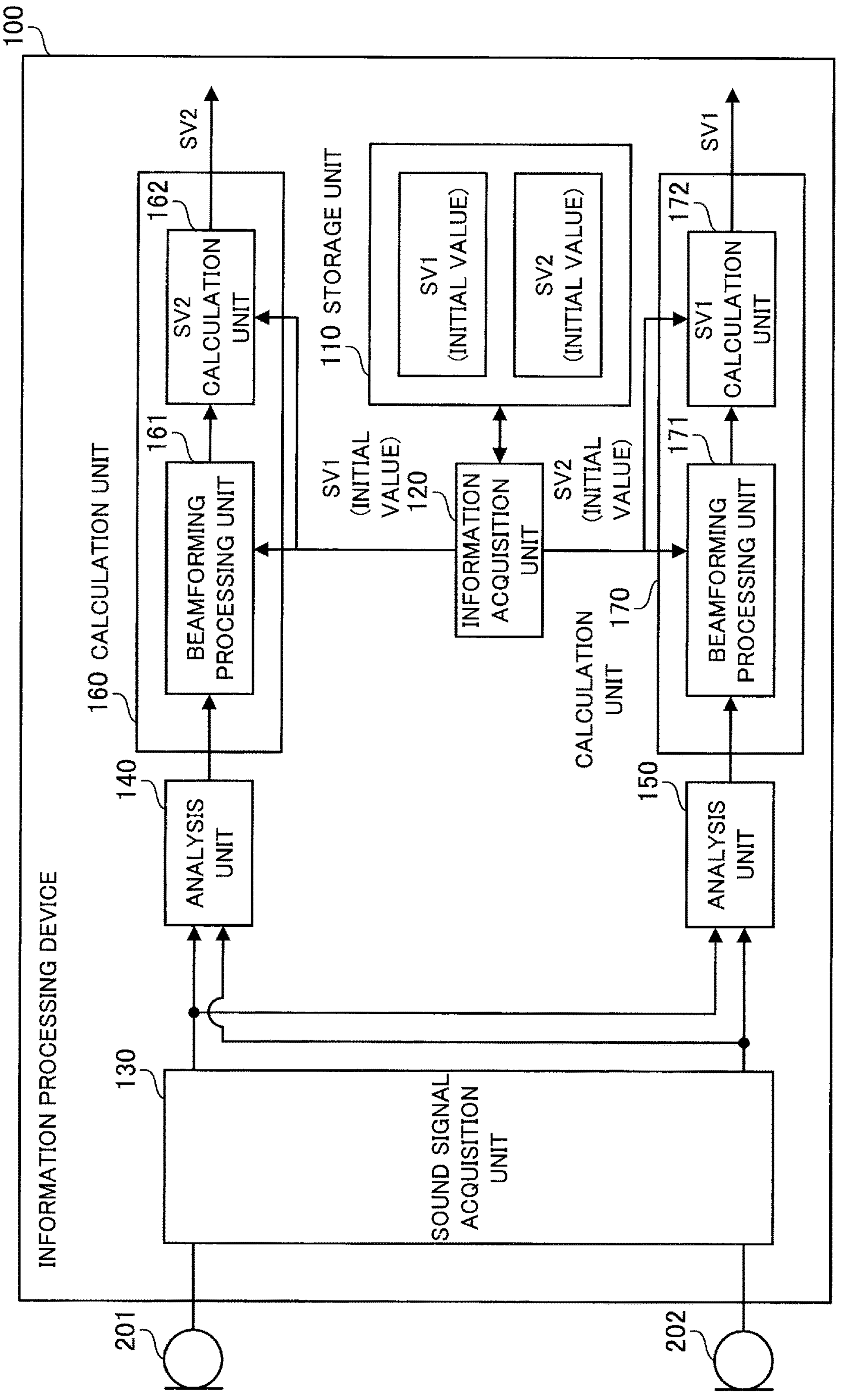
FIG. 4 is a block diagram showing function of the information processing device in the first embodiment.

FIG. 4 is a block diagram showing function of the information processing device in the first embodiment. The information processing device 100 includes a storage unit 110, an information acquisition unit 120, a sound signal acquisition unit 130, an analysis unit 140, an analysis unit 150, a calculation unit 160 and a calculation unit 170. The calculation unit 160 includes a beamforming processing unit 161 and an SV2 calculation unit 162. The calculation unit 170 includes a beamforming processing unit 171 and an SV1 calculation unit 172.

The storage unit 110 is implemented as a storage area secured in the volatile storage device 102 or the nonvolatile storage device 103.

Part or all of the information acquisition unit 120, the sound signal acquisition unit 130, the analysis unit 140, the analysis unit 150, the calculation unit 160 and the calculation unit 170 may be implemented by the processing circuitry 101.

Part or all of the information acquisition unit 120, the sound signal acquisition unit 130, the analysis unit 140, the analysis unit 150, the calculation unit 160 and the calculation unit 170 may be implemented as modules of a program executed by the processor 105. For example, the program executed by the processor 105 is referred to also as a calculation program. The calculation program has been recorded in a record medium, for example.

Here, FIG. 4 shows mics 201 and 202. The mics 201 and 202 are part of the mic array 200. A process will be described below by using the two mics. However, the number of mics can also be three or more.

The storage unit 110 stores an SV1 and an SV2 as predetermined initial values. For example, the SV1 as an initial value is referred to also as information indicating a steering vector in a first direction. In other words, the SV1 as the initial value is referred to also as a parameter indicating the steering vector in the first direction. Further, for example, the SV2 as an initial value is referred to also as information indicating a steering vector in a second direction. In other words, the SV2 as the initial value is referred to also as a parameter indicating the steering vector in the second direction.

The information acquisition unit 120 acquires the SV1 as the initial value and the SV2 as the initial value. For example, the information acquisition unit 120 acquires the SV1 as the initial value and the SV2 as the initial value from the storage unit 110. Here, the SV1 as the initial value and the SV2 as the initial value may also be stored in an external device. For example, the external device is a cloud server. In the case where the SV1 as the initial value and the SV2 as the initial value are stored in an external device, the information acquisition unit 120 acquires the SV1 as the initial value and the SV2 as the initial value from the external device.

The sound signal acquisition unit 130 acquires sound signals outputted from the mics 201 and 202. The analysis units 140 and 150 analyze frequencies of the sound signals based on the sound signals.

The calculation unit 160 is referred to also as a first calculation unit. Detailed processing of the calculation unit 160 is implemented by the beamforming processing unit 161 and the SV2 calculation unit 162.

The beamforming processing unit 161 forms a beam in an SV1 direction by executing the adaptive beamforming by using the SV1 as the initial value. Further, the MV method is used in the adaptive beamforming. The SV2 calculation unit 162 calculates a null beam direction based on an SV and a filter for suppressing sound.

The calculation unit 170 is referred to also as a second calculation unit. Detailed processing of the calculation unit 170 is implemented by the beamforming processing unit 171 and the SV1 calculation unit 172.

The beamforming processing unit 171 forms a beam in an SV2 direction by executing the adaptive beamforming by using the SV2 as the initial value. Further, the MV method is used in the adaptive beamforming. The SV1 calculation unit 172 calculates a null beam direction based on an SV and a filter for suppressing sound.

Here, the SV1 direction is assumed to be the driver seat direction. The SV2 direction is assumed to be the passenger seat direction.

Figure 5:
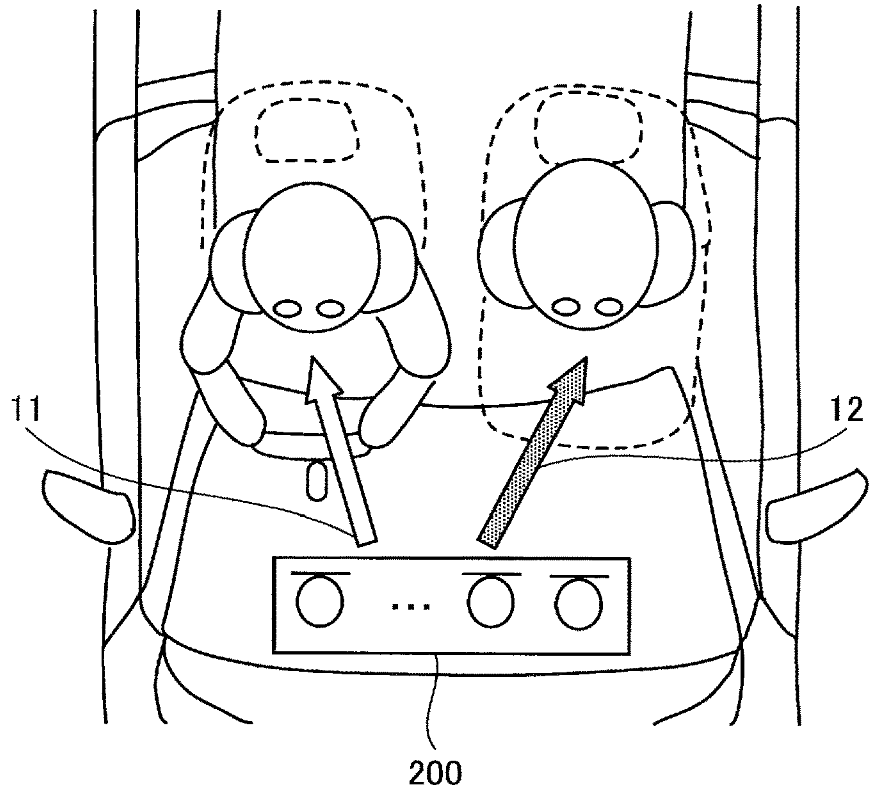
FIG. 5 is a diagram showing an example of a case in the first embodiment where a driver seat direction is a target sound direction.

FIG. 5 is a diagram showing an example of a case in the first embodiment where the driver seat direction is the target sound direction. The beamforming processing unit 161 is capable of separating the voice of the person seated on the driver seat and the voice of the person seated on the passenger seat from each other by using the adaptive beamforming. Namely, the beamforming processing unit 161 is capable of realizing the sound source separation.

A direction indicated by an arrow 11 is the SV1 direction. Further, the direction indicated by the arrow 11 is the target sound direction. The direction indicated by the arrow 11 is referred to also as the first direction. Namely, the first direction is a direction from the mic array 200 to a target sound source (in other words, the sound source of the target sound).

A direction indicated by an arrow 12 is a direction of a beam being null (hereinafter referred to as a null beam direction). Namely, the direction indicated by the arrow 12 is referred to also as the masking sound direction or the second direction.

Figure 6:
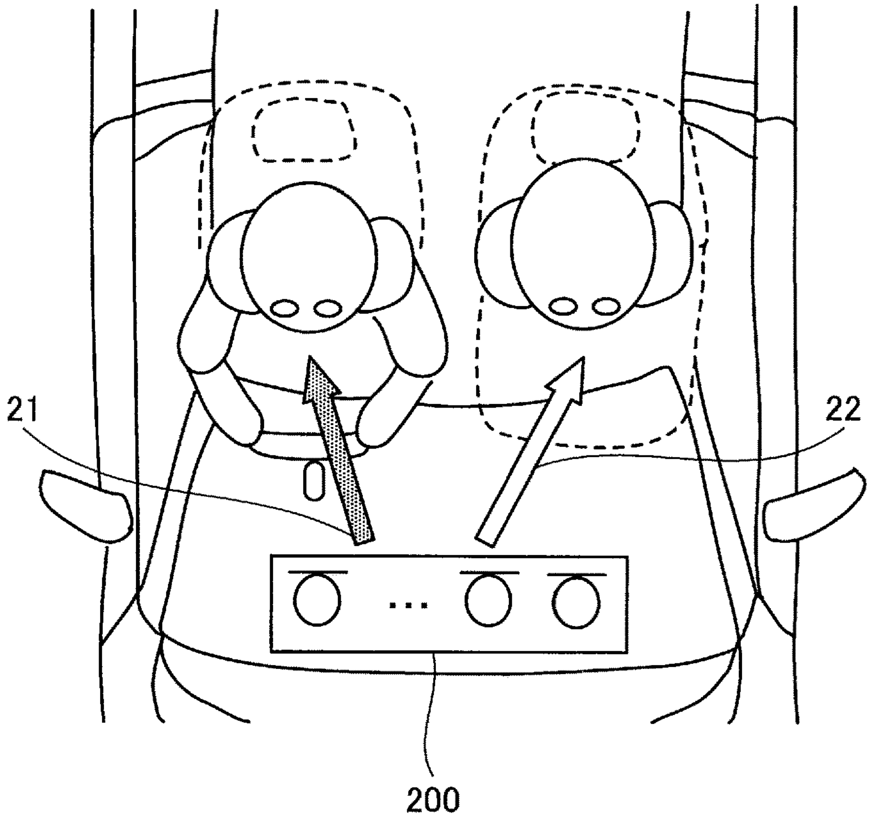
FIG. 6 is a diagram showing an example of a case in the first embodiment where a passenger seat direction is the target sound direction.

FIG. 6 is a diagram showing an example of a case in the first embodiment where the passenger seat direction is the target sound direction. The beamforming processing unit 171 is capable of separating the voice of the person seated on the driver seat and the voice of the person seated on the passenger seat from each other by using the adaptive beamforming. Namely, the beamforming processing unit 171 is capable of realizing the sound source separation.

A direction indicated by an arrow 21 is the null beam direction. Namely, the direction indicated by the arrow 21 is the masking sound beam direction.

A direction indicated by an arrow 22 is the SV2 direction. Further, the direction indicated by the arrow 22 is the target sound direction.

Here, the SV1 is represented as a vector a(ω). For example, the vector a(ω) is represented by expression (2).

$$\vec{a}(\omega)=[1,a_2(\omega)/a_1(\omega),a_3(\omega)/a_1(\omega), \ldots ,a_N(\omega)/a_1(\omega)]^T \tag{2}$$

The vector a(ω) is synonymous with the SV a(ω) represented by the expression (1).

Further, the SV2 is represented as a vector b(ω). For example, the vector b(ω) is represented by expression (3).

$$\vec{b}(\omega)=[1,b_2(\omega)/b_1(\omega),b_3(\omega)/b_1(\omega), \ldots ,b_N(\omega)/b_1(\omega)]^T \tag{3}$$

Next, a process executed by the information processing device 100 will be described in detail below.

Figure 7:
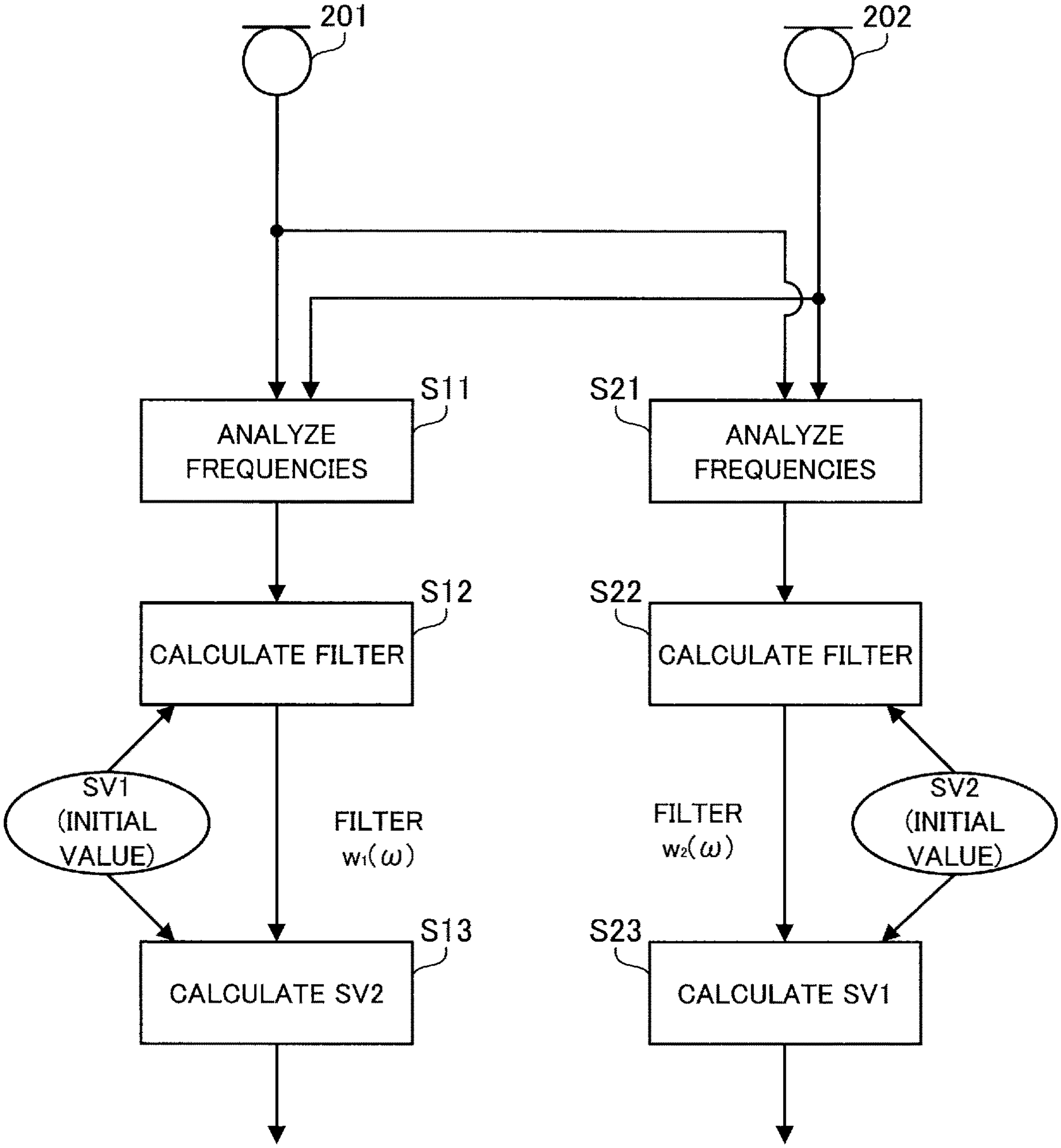
FIG. 7 is a diagram showing a process executed by the information processing device in the first embodiment.

FIG. 7 is a diagram showing a process executed by the information processing device in the first embodiment.

Steps S11 to S13 may be executed in parallel with steps S21 to S23. First, the steps S11 to S13 will be described below.

(Step S11) The analysis unit 140 analyzes the frequencies of the sound signals outputted from the mic 201 and the mic 202. For example, the analysis unit 140 analyzes the frequencies of the sound signals by using fast Fourier transform.

(Step S12) The beamforming processing unit 161 forms a beam in the SV1 direction (i.e., the vector a(ω)) and calculates a filter $w_1(\omega)$ for forming a null in the masking sound direction. Incidentally, the target sound direction is the SV1 direction. The masking sound direction is the SV2 direction (i.e., the vector b(ω)).

Here, the filter $w_1(\omega)$ is a filter for formation in the second direction. In other words, the filter $w_1(\omega)$ is a filter for the formation of the null in the second direction. Further, $w_1(\omega)$ is represented as a vector. However, there are cases where the arrow indicating that $w_1(\omega)$ is a vector is left out.

The vector a(ω) and the filter $w_1(\omega)$ are represented by the following expression (4). The expression $w_1(\omega)^H$ represents the conjugate transpose matrix of the filter $w_1(\omega)$.

$$\vec{w}_1(\omega)^H\vec{a}(\omega)=1 \tag{4}$$

Further, the vector b(ω) and the filter $w_1(\omega)$ are represented by the following expression (5):

$$\vec{w}_1(\omega)^H\vec{b}(\omega)=0 \tag{5}$$

Here, a method for calculating the vector a(ω) (i.e., the SV1 as the initial value) will be described below. In the following description, the sound source is assumed to exist at a point p. Thus, the vector a(ω) is represented as a vector $a_p(\omega)$. Incidentally, the point p is a certain point. Further, p can be expressed by a two-dimensional column vector representing one point on a plane. In the following description, M mics are used.

The distance from the point p to an m-th mic is assumed to be $l_{m,p}$. The time $t_{m,p}$ that a sound wave takes to reach the m-th mic from the point p is represented by the following expression (6). The character c represents the speed of sound.

$$t_{m,p} = \frac{l_{m,p}}{c} \tag{6}$$

When the sound source exists at the point p, a delay time $d_{m,p}$ when a sound wave emitted from the point p reaches the m-th mic with reference to the 1st mic is represented by expression (7).

$$d_{m,p}=t_{m,p}-t_{1,p} \tag{7}$$

An M-dimensional vector $a_p(\omega)$ at the frequency ω pointing towards the point p is represented by expression (8). Incidentally, the character j represents the imaginary unit.

$$\vec{a}_{m,p}(\omega)=(1e^{-2\pi j\omega d_{2,p}})^T \tag{8}$$

In the in-vehicle space, the positions of the driver seat and the passenger seat are fixed. Thus, it is possible to measure the distance between the driver seat and the mic 201 and the distance between the driver seat and the mic 202. For example, the distance between the driver seat and the mic 201 is 50 cm. The distance between the driver seat and the mic 202 is 52 cm. Further, it is possible to measure an angle between a mic and the driver seat and an angle between the mic and the passenger seat. For example, the angle between the mic 201 and the driver seat is 30°. The angle between the mic 201 and the passenger seat is 150°. As above, the vector $a_p(\omega)$ can be calculated by using the measured values and the expression (8).

The beamforming processing unit 161 calculates the filter $w_1(\omega)$ by using the MV method. Specifically, the beamforming processing unit 161 calculates the filter $w_1(\omega)$ by using expression (9). Incidentally, the frequency co is the frequency analyzed by the analysis unit 140.

$$\vec{w}_1(\omega)=\frac{R^{-1}(\omega)\vec{a}_p(\omega)}{\vec{a}_p(\omega)^H R^{-1}(\omega)\vec{a}_p(\omega)} \tag{9}$$

R(ω) represents a cross-correlation matrix. R(ω) is represented by using expression (10). Incidentally, $X_M(\omega)$ represents the frequency of a sound signal of sound inputted to the m-th mic. E represents an average.

$$R(\omega)=E\left[\begin{pmatrix} X_1(\omega)X_1^*(\omega) & \dots & X_1(\omega)X_M^*(\omega) \\ \vdots & \ddots & \vdots \\ X_M(\omega)X_1^*(\omega) & \dots & X_M(\omega)X_M^*(\omega) \end{pmatrix}\right] \tag{10}$$

As above, the beamforming processing unit 161 calculates the filter $w_1(\omega)$ based on the frequencies of the sound signal analyzed by the analysis unit 140 and the SV1 as the initial value. At the point when the filter $w_1(\omega)$ has been calculated, there remains the vector b(ω) alone as an unknown variable in the expression (4) and the expression (5).

(Step S13) The SV2 calculation unit 162 is capable of calculating the vector b(ω) by solving simultaneous equations of the expression (4) and the expression (5). Namely, the SV2 calculation unit 162 is capable of calculating the SV2. The SV2 calculation unit 162 may also calculate the SV2 by using the expression (5) alone since the filter $w_1(\omega)$ has been calculated. The calculated SV2 may be regarded as the steering vector in the second direction. Incidentally, the expression (4) and the expression (5) include no element deteriorating the accuracy of the SV2. Accordingly, the accuracy of the calculated SV2 is high.

Here, the vector b(ω) (i.e., the SV2) is the SV in the target sound direction in FIG. 6. Thus, the information processing device 100 is capable of calculating the SV in the target sound direction.

Next, the steps S21 to S23 will be described below.

(Step S21) The analysis unit 150 analyzes the frequencies of the sound signals outputted from the mic 201 and the mic 202. For example, the analysis unit 150 analyzes the frequencies of the sound signals by using fast Fourier transform.

(Step S22) The beamforming processing unit 171 forms a beam in the SV2 direction (i.e., the vector b(ω)) and calculates a filter $w_2(\omega)$ for forming a null in the masking sound direction. Incidentally, the target sound direction is the SV2 direction. The masking sound direction is the SV1 direction (i.e., the vector a(ω)).

Here, the filter $w_2(\omega)$ is a filter for formation in the first direction. In other words, the filter $w_2(\omega)$ is a filter for the formation of the null in the first direction. Further, $w_2(\omega)$ is represented as a vector. However, there are cases where the arrow indicating that $w_2(\omega)$ is a vector is left out.

The vector b(ω) and the filter $w_2(\omega)$ are represented by the following expression (11). The expression $w_2(\omega)^H$ represents the conjugate transpose matrix of the filter $w_2(\omega)$.

$$\vec{w}_2(\omega)^H\vec{b}(\omega)=1 \tag{11}$$

Further, the vector a(ω) and the filter $w_2(\omega)$ are represented by the following expression (12):

$$\vec{w}_2(\omega)^H\vec{a}(\omega)=0 \tag{12}$$

Here, a method for calculating the vector b(ω) (i.e., the SV2 as the initial value) is the same as the method for calculating the vector a(ω). For example, the vector b(ω) is represented as a vector $b_p(\omega)$.

An M-dimensional vector $b_p(\omega)$ pointing towards the point p is represented by expression (13).

$$\vec{b}_p(\omega)=(1e^{-2\pi j\omega d_{2,p}})^T \tag{13}$$

The beamforming processing unit 171 calculates the filter $w_2(\omega)$ by using the MV method. Specifically, the beamforming processing unit 171 calculates the filter $w_2(\omega)$ by using expression (14). Incidentally, the frequency ω is the frequency analyzed by the analysis unit 150.

$$\vec{w}_2(\omega)=\frac{R^{-1}(\omega)\vec{b}_p(\omega)}{\vec{b}_p(\omega)^H R^{-1}(\omega)\vec{b}_p(\omega)} \tag{14}$$

As above, the beamforming processing unit 171 calculates the filter $w_2(\omega)$ based on the frequencies of the sound signals analyzed by the analysis unit 150 and the SV2 as the initial value. At the point when the filter $w_2(\omega)$ has been calculated, there remains the vector a(ω) alone as an unknown variable in the expression (11) and the expression (12).

(Step S23) The SV1 calculation unit 172 is capable of calculating the vector a(ω) by solving simultaneous equations of the expression (11) and the expression (12). Namely, the SV1 calculation unit 172 is capable of calculating the SV1. The SV1 calculation unit 172 may also calculate the SV1 by using the expression (12) alone since the filter $w_2(\omega)$ has been calculated. The calculated SV1 may be regarded as the steering vector in the first direction. Incidentally, the expression (11) and the expression (12) include no element deteriorating the accuracy of the SV1. Accordingly, the accuracy of the calculated SV1 is high.

Here, the vector a(ω) (i.e., the SV1) is the SV in the target sound direction in FIG. 5. Thus, the information processing device 100 is capable of calculating the SV in the target sound direction.

In the above description, a case where the SV1 as the initial value can be calculated by using the expression (8) has been shown. The SV1 as the initial value can also be a measured value. Similarly, the SV2 as the initial value can also be a measured value.

According to the first embodiment, the information processing device 100 calculates the SVs without using measurement values of the impulse response. Thus, the measurer does not need to carry out the work of measuring the impulse response. Accordingly, the information processing device 100 is capable of reducing the load on the measurer.

Second Embodiment

Next, a second embodiment will be described below. In the second embodiment, the description will be given mainly of features different from those in the first embodiment. In the second embodiment, the description is omitted for features in common with the first embodiment. FIGS. 1 to 7 are referred to in the description of the second embodiment.

Figure 8:
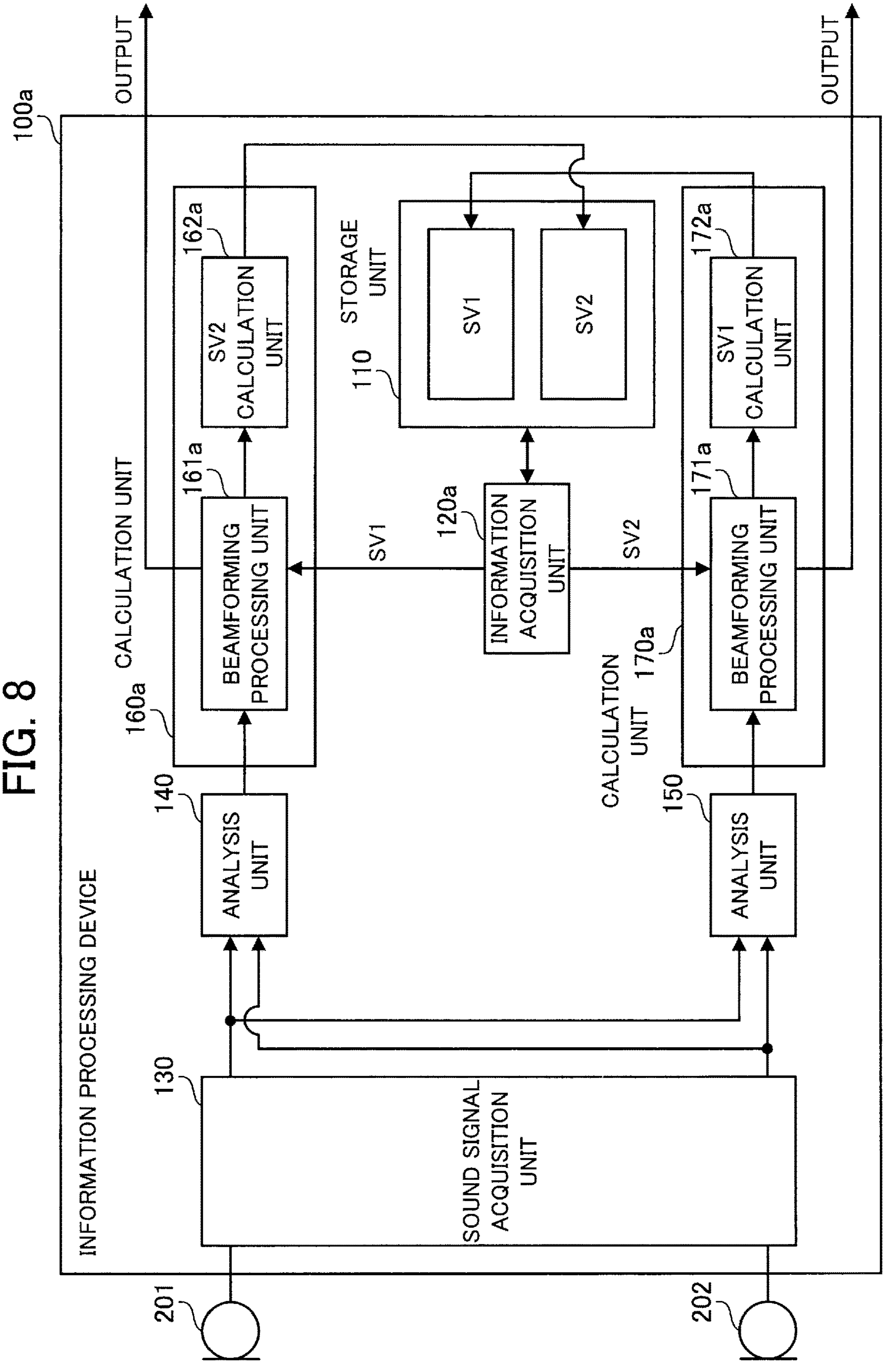
FIG. 8 is a block diagram showing function of an information processing device in a second embodiment.

FIG. 8 is a block diagram showing function of an information processing device in the second embodiment. Each component in FIG. 8 that is the same as a component shown in FIG. 4 is assigned the same reference character as in FIG. 4.

An information processing device 100*a* includes an information acquisition unit 120*a*, a calculation unit 160*a* and a calculation unit 170*a*. The calculation unit 160*a* includes a beamforming processing unit 161*a* and an SV2 calculation unit 162*a*. The calculation unit 170*a* includes a beamforming processing unit 171*a* and an SV1 calculation unit 172*a*.

The beamforming processing unit 161*a* has the function of the beamforming processing unit 161. The SV2 calculation unit 162*a* has the function of the SV2 calculation unit 162.

The beamforming processing unit 171*a* has the function of the beamforming processing unit 171. The SV1 calculation unit 172*a* has the function of the SV1 calculation unit 172.

The SV2 calculation unit 162*a* updates the SV2 stored in the storage unit 110 to the calculated SV2. The information acquisition unit 120*a* transmits the updated SV2 to the beamforming processing unit 171*a*. The beamforming processing unit 171*a* executes a process of forming a beam in the passenger seat direction based on the updated SV2. By this process, the information processing device 100*a* is capable of outputting a sound signal in which sound in the passenger seat direction has been emphasized.

Further, after the calculation of the SV2, the sound signal acquisition unit 130 acquires sound signals outputted from the mics 201 and 202. The beamforming processing unit 171*a* calculates the filter $w_2$ by using the frequencies of the sound signals acquired after the calculation of the SV2 and the updated SV2. Then, the SV1 calculation unit 172*a* calculates the SV1 by using the expression (12) and updates the SV1 stored in the storage unit 110 to the calculated SV1. As above, the information processing device 100*a* repeats the update of the SV1. Accordingly, the information processing device 100*a* is capable of calculating the SV with high accuracy even when the direction of voice uttered by the person seated on the driver seat changes with time.

The SV1 calculation unit 172*a* updates the SV1 stored in the storage unit 110 to the calculated SV1. The information acquisition unit 120*a* transmits the updated SV1 to the beamforming processing unit 161*a*. The beamforming processing unit 161*a* executes a process of forming a beam in the driver seat direction based on the updated SV1. By this process, the information processing device 100*a* is capable of outputting a sound signal in which sound in the driver seat direction has been emphasized.

Further, after the calculation of the SV1, the sound signal acquisition unit 130 acquires sound signals outputted from the mics 201 and 202. The beamforming processing unit 161*a* calculates the filter $w_1$ by using the frequencies of the sound signals acquired after the calculation of the SV1 and the updated SV1. Then, the SV2 calculation unit 162*a* calculates the SV2 by using the expression (5) and updates the SV2 stored in the storage unit 110 to the calculated SV2. As above, the information processing device 100*a* repeats the update of the SV2. Accordingly, the information processing device 100*a* is capable of calculating the SV with high accuracy even when the direction of voice uttered by the person seated on the passenger seat changes with time.

Third Embodiment

Next, a third embodiment will be described below. In the third embodiment, the description will be given mainly of features different from those in the first embodiment. In the third embodiment, the description is omitted for features in common with the first embodiment. FIGS. 1 to 7 are referred to in the description of the third embodiment.

Figure 9:
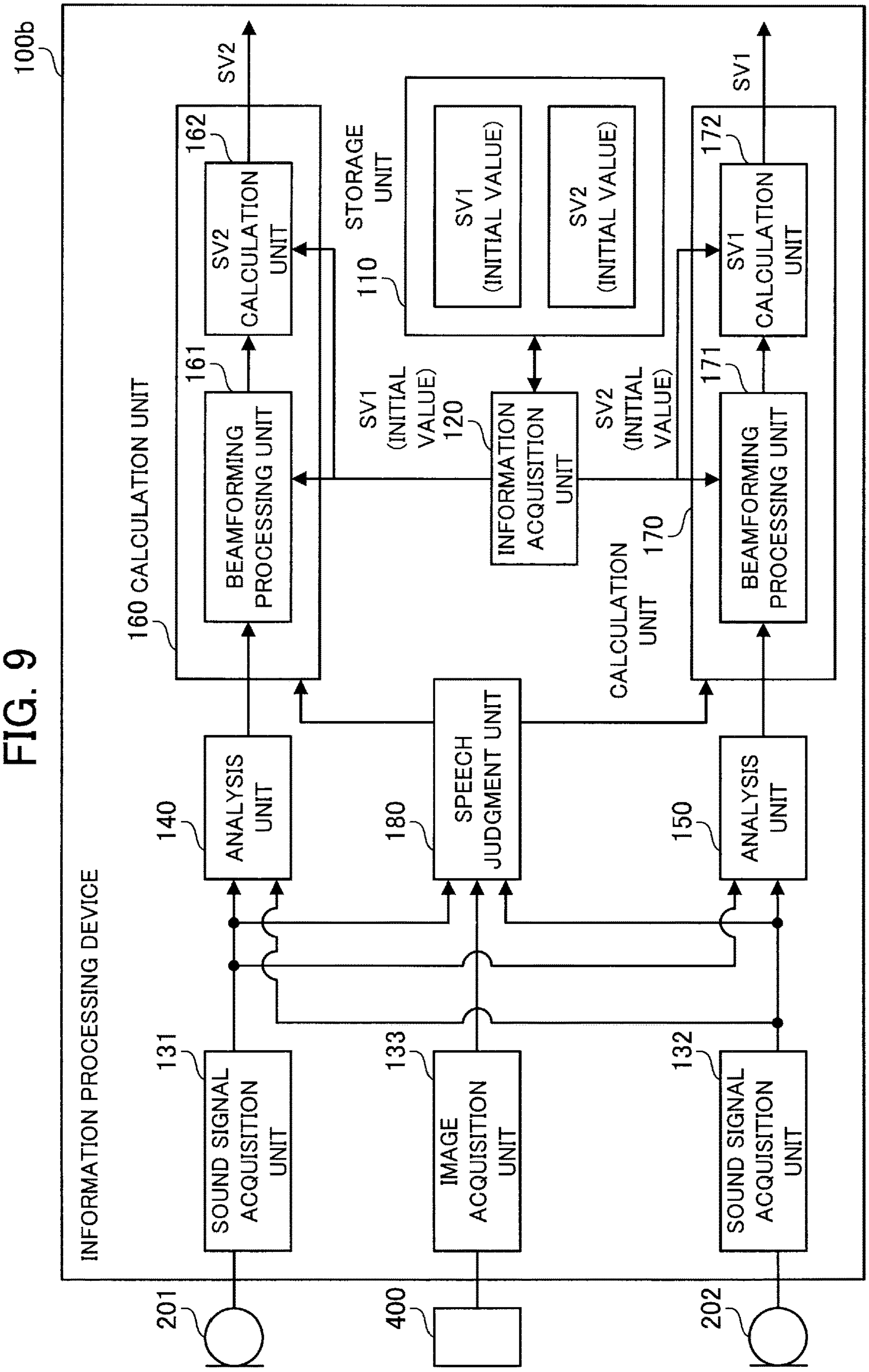
FIG. 9 is a block diagram showing function of an information processing device in a third embodiment.

FIG. 9 is a block diagram showing function of an information processing device in the third embodiment. An information processing device 100*b* is connected to a camera 400. Each component in FIG. 9 that is the same as a component shown in FIG. 4 is assigned the same reference character as in FIG. 4.

The information processing device 100*b* includes a speech judgment unit 180. The speech judgment unit 180 judges whether or not there occurred speech in the SV1 direction or the SV2 direction. For example, the speech judgment unit 180 makes the judgment on speech by using the sound signals outputted from the mics 201 and 202 and a learning model. The speech judgment unit 180 may also make the judgment on speech based on an image obtained by the camera 400 by photographing a user. For example, the speech judgment unit 180 analyzes a plurality of images and makes the judgment on speech based on movement of the mouth of a person.

Specifically, the speech judgment unit 180 judges whether it is a case where speech occurred in the SV1 direction, a case where speech occurred in the SV2 direction, a case where speech occurred at the same time in the SV1 direction and the SV2 direction, or a case where no speech occurred. Incidentally, the direction is determined based on the phase difference of the sound signals, for example.

In the case where speech occurred in the SV1 direction, the speech judgment unit 180 transmits an operation command to the beamforming processing unit 171. In the case where speech occurred in the SV2 direction, the speech judgment unit 180 transmits an operation command to the beamforming processing unit 161. In the case where speech occurred at the same time in the SV1 direction and the SV2 direction or no speech occurred, the speech judgment unit 180 performs nothing. As above, the speech judgment unit 180 transmits the operation command when speech occurred in the masking sound direction.

When receiving the operation command, the calculation unit 160, 170 calculates the filter. Here, the cross-correlation matrix R(ω) is used for the calculation of the filter. The cross-correlation matrix R(ω) represents an average. For example, the cross-correlation matrix R(ω) used for the second calculation of the filter is the average of the matrix representing frequency components at this time and the cross-correlation matrix RN) at the previous time. The increase in the number of times of calculating the filter leads to convergence on one cross-correlation matrix R(ω). By the convergence on one cross-correlation matrix R(ω), the accuracy of the formed null can be increased. Accordingly, the information processing device 100*b* is capable of increasing the accuracy of the formed null by calculating the filter a plurality of times. The process will be described in detail below.

The calculation unit 160 executes the following process when receiving the operation command. Namely, the calculation unit 160 executes the following process when speech occurred in the SV2 direction. Each time sound signals outputted from the mics 201 and 202 are acquired, the calculation unit 160 calculates the filter $w_1$ by using the frequencies of the acquired sound signals, the SV1 as the initial value, and the cross-correlation matrix. The cross-correlation matrix is the average of the matrix representing the frequency components of the acquired sound signals and the cross-correlation matrix used in the calculation of the filter $w_1$ the previous time. As above, the calculation unit 160 calculates the filter $w_1$ a plurality of times. Further, the calculation unit 160 may also execute the above process even when no operation command is received.

The calculation unit 170 executes the following process when receiving the operation command. Each time sound signals outputted from the mics 201 and 202 are acquired, the calculation unit 170 calculates the filter $w_2$ by using the frequencies of the acquired sound signals, the SV2 as the initial value, and the cross-correlation matrix. The cross-correlation matrix is the average of the matrix representing the frequency components of the acquired sound signals and the cross-correlation matrix used in the calculation of the filter $w_2$ the previous time. As above, the calculation unit 170 calculates the filter $w_2$ a plurality of times. Further, the calculation unit 170 may also execute the above process even when no operation command is received.

The first to third embodiments have described examples of cases where the mic array 200 installed in a vehicle acquires sound. The first to third embodiments are applicable to cases where the mic array 200 is installed in a meeting room where a videoconference is held, cases where a television set is equipped with the mic array 200, and so forth.

Features in the embodiments described above can be appropriately combined with each other.

DESCRIPTION OF REFERENCE CHARACTERS

11, 12, 21, 22: arrow, 100, 100*a*, 100*b*: information processing device, 101: processing circuitry, 102: volatile storage device, 103: nonvolatile storage device, 104: interface unit, 105: processor, 110: storage unit, 120, 120*a*: information acquisition unit, 130: sound signal acquisition unit, 140, 150: analysis unit, 160, 160*a*, 170, 170*a*: calculation unit, 161, 161*a*: beamforming processing unit, 162, 162*a*: SV2 calculation unit, 171, 171*a*: beamforming processing unit, 172, 172*a*: SV1 calculation unit, 180: speech judgment unit, 200: mic array, 201, 202: mic, 300: output device, 400: camera

What is claimed is:

1. An information processing device comprising:

a sound signal acquiring circuitry to acquire sound signals outputted from a plurality of microphones;

an analyzing circuitry to analyze frequencies of the sound signals;

an information acquiring circuitry to acquire predetermined information indicating a steering vector in a first direction as a direction from the plurality of microphones to a target sound source; and a first calculating circuitry to calculate a filter for formation in a second direction as a direction different from the first direction based on the frequencies and the information indicating the steering vector in the first direction and calculate a steering vector in the second direction by using an expression indicating a relationship between the calculated filter and the steering vector in the second direction.

2. The information processing device according to claim 1, further comprising a second calculating circuitry, wherein the information acquiring circuitry acquires predetermined information indicating the steering vector in the second direction, and the second calculating circuitry calculates a filter for formation in the first direction based on the frequencies and the information indicating the steering vector in the second direction and calculates the steering vector in the first direction by using an expression indicating a relationship between the calculated filter and the steering vector in the first direction.

3. The information processing device according to claim 2, wherein the second calculating circuitry includes a beamforming processing circuitry, and the beamforming processing circuitry executes a process of forming a beam in the second direction based on the calculated steering vector in the second direction.

4. The information processing device according to claim 2, wherein the first calculating circuitry includes a beamforming processing circuitry, and the beamforming processing circuitry executes a process of forming a beam in the first direction based on the calculated steering vector in the first direction.

5. The information processing device according to claim 2, wherein the sound signal acquiring circuitry acquires sound signals outputted from the plurality of microphones after the calculation of the steering vector in the first direction, and the first calculating circuitry calculates the filter for the formation in the second direction by using frequencies of the sound signals acquired after the calculation of the steering vector in the first direction and the calculated steering vector in the first direction and calculates the steering vector in the second direction by using an expression indicating a relationship between the calculated filter and the steering vector in the second direction.

6. The information processing device according to claim 2, wherein the sound signal acquiring circuitry acquires sound signals outputted from the plurality of microphones after the calculation of the steering vector in the second direction, and the second calculating circuitry calculates the filter for the formation in the first direction by using frequencies of the sound signals acquired after the calculation of the steering vector in the second direction and the calculated steering vector in the second direction and calculates the steering vector in the first direction by using an expression indicating a relationship between the calculated filter and the steering vector in the first direction.

7. The information processing device according to claim 2, wherein each time sound signals outputted from the plurality of microphones are acquired, the second calculating circuitry calculates the filter for the formation in the first direction by using frequencies of the acquired sound signals, the information indicating the steering vector in the second direction, and a cross-correlation matrix, and the cross-correlation matrix is an average of a matrix representing frequency components of the acquired sound signals and the cross-correlation matrix used in the calculation of the filter at the previous time.

8. The information processing device according to claim 7, further comprising a speech judging circuitry to judge whether or not there occurred speech in the first direction or the second direction based on an image obtained by photographing a user or sound signals outputted from the plurality of microphones, wherein the second calculating circuitry calculates the filter for the formation in the first direction when there occurred speech in the first direction.

9. The information processing device according to claim 1, wherein each time sound signals outputted from the plurality of microphones are acquired, the first calculating circuitry calculates the filter for the formation in the second direction by using frequencies of the acquired sound signals, the information indicating the steering vector in the first direction, and a cross-correlation matrix, and the cross-correlation matrix is an average of a matrix representing frequency components of the acquired sound signals and the cross-correlation matrix used in the calculation of the filter at the previous time.

10. The information processing device according to claim 9, further comprising a speech judging circuitry to judge whether or not there occurred speech in the first direction or the second direction based on an image obtained by photographing a user or sound signals outputted from the plurality of microphones, wherein the first calculating circuitry calculates the filter for the formation in the second direction when there occurred speech in the second direction.

11. A calculation method performed by an information processing device, the calculation method comprising:

acquiring sound signals outputted from a plurality of microphones;

analyzing frequencies of the sound signals;

acquiring predetermined information indicating a steering vector in a first direction as a direction from the plurality of microphones to a target sound source;

calculating a filter for formation in a second direction as a direction different from the first direction based on the frequencies and the information indicating the steering vector in the first direction; and calculating a steering vector in the second direction by using an expression indicating a relationship between the calculated filter and the steering vector in the second direction.

12. An information processing device comprising:

a processor to execute a program; and a memory to store the program which, when executed by the processor, performs processes of, acquiring sound signals outputted from a plurality of microphones;

analyzing frequencies of the sound signals;

acquiring predetermined information indicating a steering vector in a first direction as a direction from the plurality of microphones to a target sound source;

calculating a filter for formation in a second direction as a direction different from the first direction based on the frequencies and the information indicating the steering vector in the first direction; and calculating a steering vector in the second direction by using an expression indicating a relationship between the calculated filter and the steering vector in the second direction.

* * * * *